United States Patent
Lohr et al.

(10) Patent No.: US 9,335,406 B2
(45) Date of Patent: May 10, 2016

(54) PHOTONICALLY ENABLED RF TRANSMITTER/RECEIVER

(71) Applicant: The Johns Hopkins University, Baltimore, MD (US)

(72) Inventors: Michele B. Lohr, Ellicott City, MD (US); Raymond M. Sova, Reisterstown, MD (US); Michael L. Dennis, Ellicott City, MD (US); Richard E. Pavek, Silver Spring, MD (US); Kevin B. Funk, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 419 days.

(21) Appl. No.: 13/946,202

(22) Filed: Jul. 19, 2013

(65) Prior Publication Data

US 2014/0022119 A1    Jan. 23, 2014

Related U.S. Application Data

(60) Provisional application No. 61/674,473, filed on Jul. 23, 2012.

(51) Int. Cl.
*G01S 13/02* (2006.01)
*G01S 13/86* (2006.01)
*H04B 10/2575* (2013.01)
*H04B 10/90* (2013.01)

(52) U.S. Cl.
CPC .............. *G01S 13/86* (2013.01); *G01S 13/02* (2013.01); *H04B 10/2575* (2013.01); *H04B 10/90* (2013.01); *H04B 2210/006* (2013.01)

(58) Field of Classification Search
CPC ..... G01S 13/02; G01S 13/86; H04B 10/2575; H04B 10/90; H04B 2210/006

USPC .................. 342/25 R, 52; 398/116
See application file for complete search history.

(56) References Cited

U.S. PATENT DOCUMENTS

| | | | |
|---|---|---|---|
| 6,407,846 B1 | 6/2002 | Myers et al. | |
| 6,791,734 B2 | 9/2004 | Izadpanah | |
| 6,963,442 B2 | 11/2005 | Yap et al. | |
| 7,421,168 B1 | 9/2008 | Goutzoulis | |
| 7,446,696 B2 * | 11/2008 | Kondo | G01S 7/35 |
| | | | 180/167 |

(Continued)

OTHER PUBLICATIONS

Goyette, Thomas M. et al., "Acquisition of UHF and X-Band ISAR imagery using 1/35th Scale-models," University of Massachusetts Lowell, Submillimeter-Wave Technology Laboratory, pp. 1-11, May 2005.

(Continued)

*Primary Examiner* — Timothy A Brainard
(74) *Attorney, Agent, or Firm* — Noah J. Hayward

(57) ABSTRACT

A detection system includes a photonic module, a radio frequency (RF) module and processing circuitry. The photonic module may be configured to generate an optical tone for modulation in an optical domain prior to conversion to the RF domain. The RF module may be configured to interface with the photonic module to receive a transmission signal converted from the optical domain. The processing circuitry may be configured to interface with the photonic module and RF module to enable an operator to control of the photonic module and the RF module at least with respect to selectively determining a carrier frequency of the optical tone and a modulation technique to be employed with respect to the transmission signal converted from the optical domain.

20 Claims, 7 Drawing Sheets

(56) References Cited

U.S. PATENT DOCUMENTS

| | | | |
|---|---|---|---|
| 7,650,080 B2 | 1/2010 | Yap et al. | |
| 7,974,534 B2 | 7/2011 | Weiner et al. | |
| 8,098,185 B2* | 1/2012 | Ridgway | G01S 7/03 342/175 |
| 8,228,226 B2* | 7/2012 | Chan | H04L 1/20 342/132 |
| 8,400,349 B1* | 3/2013 | Dubbert | G01S 7/32 342/113 |
| 2002/0131128 A1 | 9/2002 | Myers et al. | |
| 2003/0035162 A1 | 2/2003 | Myers et al. | |
| 2009/0184860 A1* | 7/2009 | Chan | H04L 1/20 342/21 |
| 2011/0150485 A1 | 6/2011 | Seidel | |

OTHER PUBLICATIONS

Coulombe, M.J. et al., "A 160 GHZ Polarimetric Compact Range for Scale Model RCS Measurements," Antenna Measurements and Techniquers ASsociation (AMTA) Proceedings, pp. 1-6, Oct. 1996.

Demartinis, Guy B. et al., "A 240 GHZ Polarimetric Compact Range for Scale Model RCS Measurements," Massachusetts Univ Lowell Submillimeter-Wave Tech Lab, pp. 1-6, Oct. 2010.

McMakin, Doug, "Millimeter Wave Technology Meets the Market," Advertising Document PNNL-SA-55316, Pacific Northwest National Laboratory, pp. 1-2, Aug. 2008.

Sheen, David M. et al., "Three-Dimensional Millimeter-Wave Imaging for Concealed Weapon Detection," IEEE Transactions on Microwave Theory & Techniques, vol. 49, No. 9, pp. 1581-1592, Sep. 2001.

Wallace, H. Bruce, "Analysis of RF imaging applications at frequencies over 100 GHz," Applied Optics, vol. 49, No. 19, pp. E38-E47, Jul. 1, 2010.

Sheen, David M. et al., "Speckle in active millimeter-wave and terahertz imaging and spectroscopy," Passive Millimeter-Wave Imaging Technology X, Proc. of SPIE, vol. 6548, pp. 654809-1-654809-10, 2007).

Giles, R.H. et al., "Acquisition and Analysis of X-Band Moving Target Signature Data using a 160 GHz Compact Range," Automatic Target Recognition XI, Proc. of SPIE, vol. 4379, pp. 289-299, 2001.

Goyette, Thomas M. et al., "X-band tSAR imagery of scale-model tactical targets using a wide bandwidth 350GHz compact range," Algorithms for Synthetic Aperture Radar Imagery XI, Proceedings of SPIE, vol. 5427, pp. 227-236, Sep. 2, 2004.

* cited by examiner ional Application No. 61/674,473 filed on Jul. 23,
PHOTONICALLY ENABLED RF TRANSMITTER/RECEIVER

CROSS-REFERENCE TO RELATED APPLICATION

This application claims priority to and the benefit of U.S. Provisional Application No. 61/674,473 filed on Jul. 23, 2012, the entire contents of which are hereby incorporated herein by reference.

TECHNICAL FIELD

Exemplary embodiments of the present disclosure generally relate to radio frequency (RF) transmission and/or reception technology, and more specifically relate to employment of a photonically enabled RF transmitter and/or receiver.

BACKGROUND

Radar is one example of a system that employs RF technology to obtain useful ranging information. However, other useful information (e.g., Doppler and radar cross section) can also be obtained by employing RF technology. Testing of systems that are designed to employ RF technology to obtain desired detection and/or ranging information can be expensive, and the digital simulations associated with such testing can often lack realism. Accordingly, a mechanism by which to generate multi-modal data for verification of digital model hypotheses and to aid system capabilities assessment with improved realism in a cost effective manner is clearly desirable.

BRIEF SUMMARY

Some example embodiments may enable the provision of a system capable of allowing accurate range measurements and other information to be gathered in connection with a system that is extremely capable and flexible. In this regard, some example embodiments may allow multiple ones of mode of operation of the system, the carrier frequency of the system, the modulation technique to be employed by the system and the processing and/or output that is to be provided by the system to be selected on the fly. Accordingly, the system could be set up for support of very wide ranges of carrier frequencies that can be modulated and processed in a variety of different ways in a relatively rapid fashion. Such a system may also be accurate enough to be useful for subscale radar testing, and be capable enough to be employed in the field. In addition to radar, this system can be used as a flexible, tunable wideband signal generator or frequency source.

In one example embodiment, a detection system is provided. The detection system may include a photonic module, an RF module and processing circuitry. The photonic module may be configured to generate an optical tone for modulation in an optical domain prior to conversion to a radio frequency (RF) domain. The RF module may be configured to interface with the photonic module to receive a transmission signal converted from the optical domain. The processing circuitry may be configured to interface with the photonic module and RF module to enable an operator to control of the photonic module and the RF module at least with respect to selectively determining a carrier frequency of the optical tone and a modulation technique to be employed with respect to the transmission signal converted from the optical domain.

In another example embodiment, a method of operating a detection system is provided. The method may include generating an optical tone for modulation in an optical domain, conversion of the optical tone to a radio frequency (RF) domain after the modulation, and enabling an operator to control at least with respect to selectively determining a carrier frequency of the optical tone and a modulation technique to be employed with respect to performing the modulation.

BRIEF DESCRIPTION OF THE SEVERAL VIEWS OF THE DRAWING(S)

Having thus described some example embodiments of the invention in general terms, reference will now be made to the accompanying drawings, which are not necessarily drawn to scale, and wherein:

DETAILED DESCRIPTION

Figure 1:
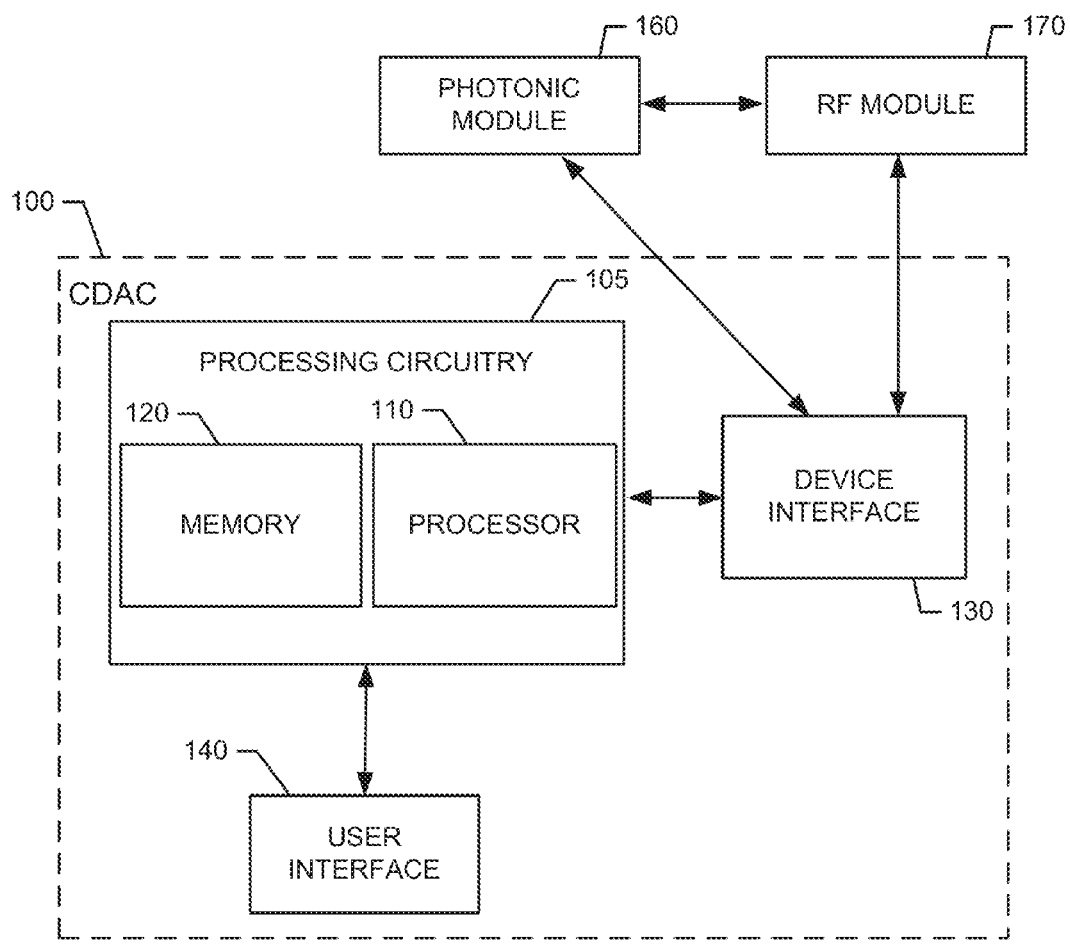
FIG. 1 illustrates a block diagram of a transmit and/or detection system of an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

A cost-effective and flexible way to generate radar data using subscale targets would be of great interest in the defense community. Using subscale targets and employing Maxwell's equations, radar effects may be held constant while scaling both target size and radar wavelength by the same factor. A millimeter-wave subscale radar can be implemented using photonics technologies, which can easily satisfy the faster pulsing and shorter pulse width requirements of a compact range scenario as well as low-phase-noise requirements that are required for pulse compression and Doppler measurements, especially at higher millimeter-wave regimes. Example embodiments described herein may provide a photonics-enabled millimeter-wave subscale radar design and may also demonstrate the use of stretch processing in connection with ranging techniques. Stretch processing is a pulse compression technique that may be used to process wide bandwidth LFM pulses. Example embodiments may therefore provide a photonic-modulation scheme for waveform encoding, dual wavelength carrier tone generation and photonic up-conversion modulation onto a carrier, all under the control of a control regime, which, in one example, non-limiting embodiment, is software-defined, although alternative example embodiments are not limited thereto, i.e. additional embodiments of the control regime may be implemented using only hardware or any combination of hardware, firmware, and/or software. Some example embodiments may alternatively provide, or be useful in the context of, a tunable wideband signal generator or frequency source.

FIG. 1 illustrates a block diagram of a transmit and/or detection system of an example embodiment. As shown in FIG. 1, the system may include a control and data acquisition computer (CDAC) 100. The CDAC 100 may enable operators to interact with the system to provide inputs and/or information for defining control and configuration instructions for other components of the system. In this regard, the CDAC 100 may be configured to enable the operator to control the mode of operation of the system, the carrier frequency of the system, the modulation technique to be employed by the system and the processing and/or output that is to be provided by the system. As such, the CDAC 100 represents a mechanism which provides control over the mode of operation of the system, the carrier frequency of the system, the modulation technique to be employed by the system and the processing and/or output that is to be provided by the system. As will be described in greater detail below, the CDAC 100 may also provide a mechanism by which to receive output information subsequent to analysis performed on received signal information.

In an example embodiment, since the CDAC 100 enables control over a wide variety of operational characteristics of the system, it should be appreciated that the CDAC 100 is capable of interfacing with corresponding modules that implement the functions desired. Accordingly, for example, the CDAC 100 may interface with a photonic module 160 that may be configured to enable photonic tone generation, waveform encoding and optical-to-RF conversion and may also interface with an RF module 170 that may be configured to perform RF transmission according to a desired RF transmission band. As such, the photonic module 160 may be the same or otherwise useable for many different RF transmission bands. In other words, the same hardware may be employed for the photonic module 160 regardless of which RF transmission band is employed. However, the RF module 170 may be slightly different for and tailored to generate Ka band (26-40 GHz), V band (50-75 GHz), W band (75-110 GHz), millimeter-wave/sub THz/THz (220-330 GHz) or any of numerous other RF transmission bands that may be used for carrier frequencies. In other words, in various different embodiments, the hardware used in the RF module 170 may be different for Ka band applications than the hardware used in the RF module 170 for W band applications.

The CDAC 100 of an example embodiment may include processing circuitry 105 that is configurable to perform actions in accordance with example embodiments described herein. As such, for example, at least some of the functions attributable to the CDAC 100 may be carried out by or otherwise instructed by the processing circuitry 105. The processing circuitry 105 may therefore provide the hardware for hosting software to configure the system for module control and implementation of analysis techniques consistent with example embodiments. Transmission of RF energy and/or subsequent detection of targets/objects of interest and delineation of information about such targets for consumption by analysts or other operators may then be accomplished using the processing circuitry 105.

The processing circuitry 105 may be configured to perform data processing, control function execution and/or other processing and management services according to an example embodiment of the present invention. In some embodiments, the processing circuitry 105 may be embodied as a chip or chip set. In other words, the processing circuitry 105 may comprise one or more physical packages (e.g., chips) including materials, components and/or wires on a structural assembly (e.g., a baseboard).

In an example embodiment, the processing circuitry 105 may include one or more instances of a processor 110 and memory 120 that may be in communication with or otherwise control a device interface 130 and, in some cases, a user interface 140. As such, the processing circuitry 105 may be embodied as a circuit chip (e.g., an integrated circuit chip) configured (e.g., with hardware, software or a combination of hardware, firmware, and/or software) to perform operations described herein.

The user interface 140 (if implemented) may be in communication with the processing circuitry 105 to receive an indication of a user input at the user interface 140 and/or to provide an audible, visual, mechanical or other output to the user. As such, the user interface 140 may include, for example, a display, printer, one or more buttons or keys (e.g., function buttons), and/or other input/output mechanisms (e.g., keyboard, touch screen, mouse, microphone, speakers, cursor, joystick, lights and/or the like). The user interface 140 may display information indicating an identity or certain characteristics associated with a received signal (e.g., including identification of targets or identification of characteristics of targets) being processed by the CDAC 100. The characteristic or identity information may then be processed and information associated therewith may be presented on a display of the user interface 140 based on instructions executed by the processing circuitry 105 for the analysis of the data according to prescribed methodologies and/or algorithms. Moreover, in some cases, the user interface 140 may include options for selection of one or more reports to be generated based on the analysis of a given data set.

The device interface 130 may include one or more interface mechanisms for enabling communication with other external devices (e.g., output devices, input devices and/or the like) or internal functional components of the transmit and/or detection system. In some cases, the device interface 130 may be any means such as a device or circuitry embodied in either hardware, or a combination of hardware, firmware, and/or software that is configured to receive and/or transmit data from/to devices and/or modules in communication with the processing circuitry 105. Thus, the device interface 130 may enable the CDAC 100 to communicate with the photonic module 160 and the RF module 170.

In an exemplary embodiment, the memory 120 may include one or more non-transitory memory devices such as, for example, volatile and/or non-volatile memory that may be either fixed or removable. The memory 120 may be configured to store information, data, applications, instructions or the like for enabling the processing circuitry 105 to carry out various functions in accordance with exemplary embodiments of the present invention. For example, the memory 120 could be configured to buffer input data for processing by the processor 110. Additionally or alternatively, the memory 120 could be configured to store instructions for execution by the processor 110. As yet another alternative, the memory 120 may include one or more databases that may store a variety of data sets indicative of patterns, return data, characteristic information, processing algorithms and/or the like to be employed for the execution of example embodiments. Among the contents of the memory 120, applications may be stored for execution by the processor 110 in order to carry out the functionality associated with each respective application. In some non-limiting example embodiments, the applications may include directions for control of the processing circuitry 105 to enable software control of the mode of operation of the system, the carrier frequency of the system, the modulation technique to be employed by the system and the processing and/or output that is to be provided by the system. As such, for example, the memory 120 may include applications that direct generation and presentation of output data subsequent to analyzing received signal data to identify targets/objects of interest.

The processor 110 may be embodied in a number of different ways. For example, the processor 110 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 110 may be configured to execute instructions stored in the memory 120 or otherwise accessible to the processor 110. As such, whether configured by hardware or by a combination of hardware, firmware, and/or software, the processor 110 may represent an entity (e.g., physically embodied in circuitry—in the form of processing circuitry 105) capable of performing operations according to embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 (which could in some cases otherwise be a general purpose processor) to perform the operations described herein.

In an example embodiment, the processor 110 (or the processing circuitry 105) may be embodied as, include or otherwise control the processing circuitry 105, and therefore also the CDAC 100. As such, in some embodiments, the processor 110 (or the processing circuitry 105) may be said to cause each of the operations described in connection with the processing circuitry 105, the CDAC 100, and/or the modules by directing the processing circuitry 105, the CDAC 100, and/or the modules to undertake the corresponding functionalities responsive to execution of instructions or algorithms configuring the processor 110 (or processing circuitry 105) accordingly.

Figure 2:
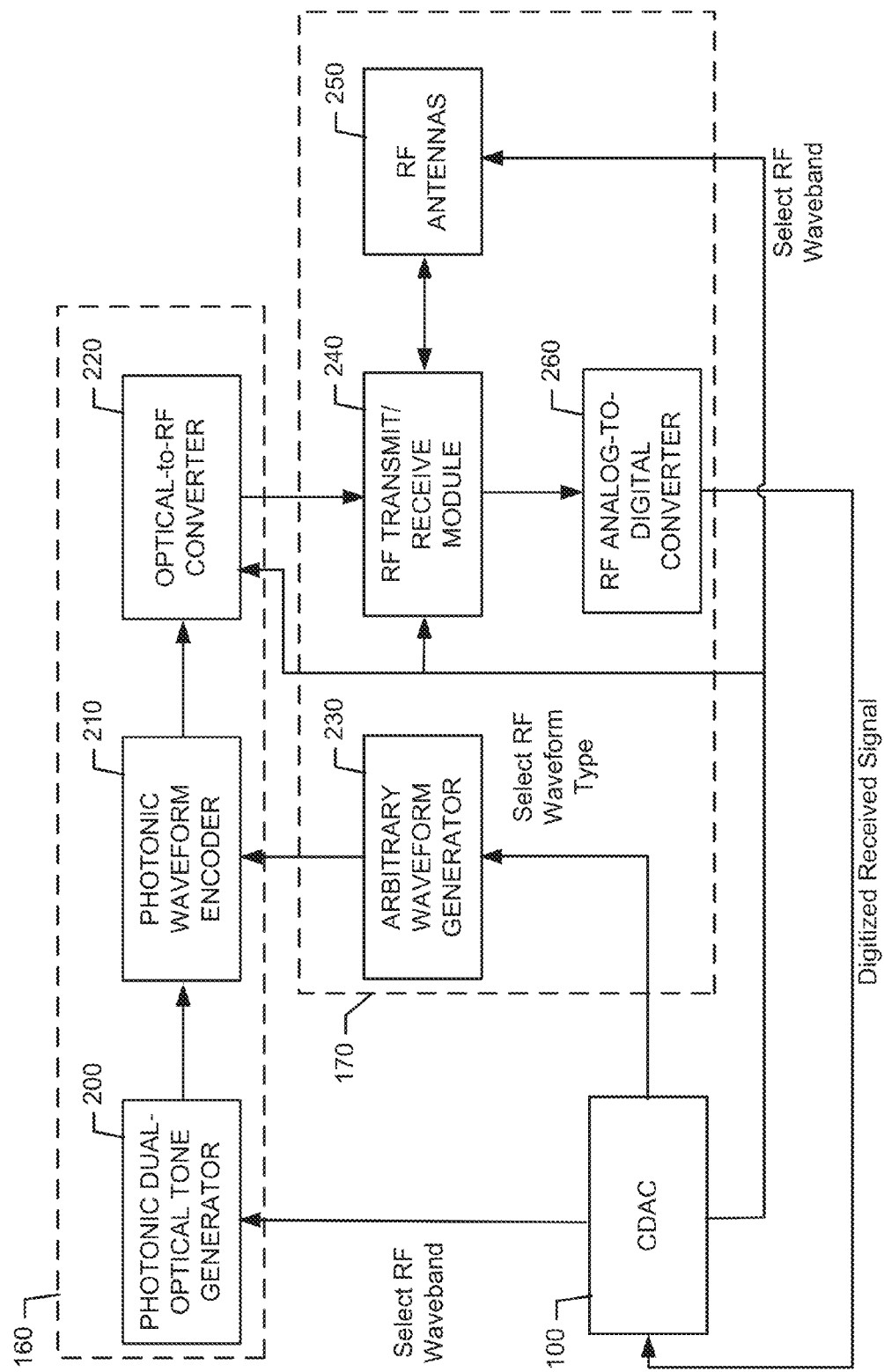
FIG. 2 illustrates a more detailed block diagram of a transmit and/or detection system of an example embodiment.

FIG. 2 illustrates a more detailed block diagram of the system of an example embodiment. As shown in FIG. 2, the CDAC 100 may interface with components of the photonic module 160 and the RF module 170 to enable RF waveband selection and to direct selection of an RF waveform type to be employed, and also to receive digitized received signal information. Moreover, as shown in FIG. 2, the photonic module 160 may include a photonic dual-optical tone generator 200, a photonic waveform encoder 210 and an optical-to-RF converter 220.

In an example embodiment, the photonic dual-optical tone generator 200 may be configured to receive information indicative of the selected RF waveband from the CDAC 100. The photonic dual-optical tone generator 200 may include a laser source such as, for example, a low phase-noise tunable laser in conjunction with a Mach-Zehnder (MZ) modulator or a Stimulated Brillouin Scattering (SBS) laser. An output of the photonic dual-optical tone generator 200 may be provided on the basis of the RF waveband selection made at the CDAC 100. In this regard, the CDAC 100 may enable selection of a wide range of carrier frequencies to be generated by the photonic dual-optical tone generator 200. The output of the photonic dual-optical tone generator 200 may be provided to the photonic waveform encoder 210 for modulation of the carrier frequency selected.

In an example embodiment, an arbitrary waveform generator 230 may receive information indicative of the selected RF waveform type from the CDAC 100 and may generate a waveform accordingly for provision to the photonic waveform encoder 210. The photonic waveform encoder 210 may undertake modulation of the carrier frequency to execute the desired modulation of the carrier frequency, as directed by the CDAC 100. Thereafter, the modulated carrier may be provided to the optical-to-RF converter 220, which may be configured to translate the modulated carrier signal received from the optical domain to the RF domain. In some embodiments, the optical-to-RF converter 220 may be configured to perform any desirable conversion by interacting with an RF transmit/receive module 240, which may form a portion of the RF module 170.

The RF transmit/receive module 240, along with the RF antennas 250 and the RF analog-to-digital (A/D) converter 260 may form portions of the RF module 170 that include at least some hardware portions that are specific to the RF transmission band being utilized. In an example embodiment, the RF transmit/receive module 240 may receive information indicative of the selected RF waveband from the CDAC 100 and may receive the converted RF output from the optical-to-RF converter 220 to enable the RF transmit/receive module 240 to provide transmission data to the RF antennas 250 for transmission and to receive and process any received signal returns from the RF antennas 250. The received signal returns may then be communicated to the RF AD converter 260, which may digitize the returns and communicate them to the CDAC 100 for analysis and processing so that output data may be generated.

In an example embodiment, each of the photonic dual-optical tone generator 200, the photonic waveform encoder 210, the optical-to-RF converter 220, the arbitrary waveform generator 230, the RF transmit/receive module 240, and the RF AD converter 260 may be any means such as a device or circuitry embodied in either hardware, or a combination of hardware, firmware, and/or software that is configured to perform the corresponding functions of respective ones of the photonic dual-optical tone generator 200, the photonic waveform encoder 210, the optical-to-RF converter 220, the arbitrary waveform generator 230, the RF transmit/receive module 240, and the RF AD converter 260 as described herein under the control of the processing circuitry 105.

Figure 3:
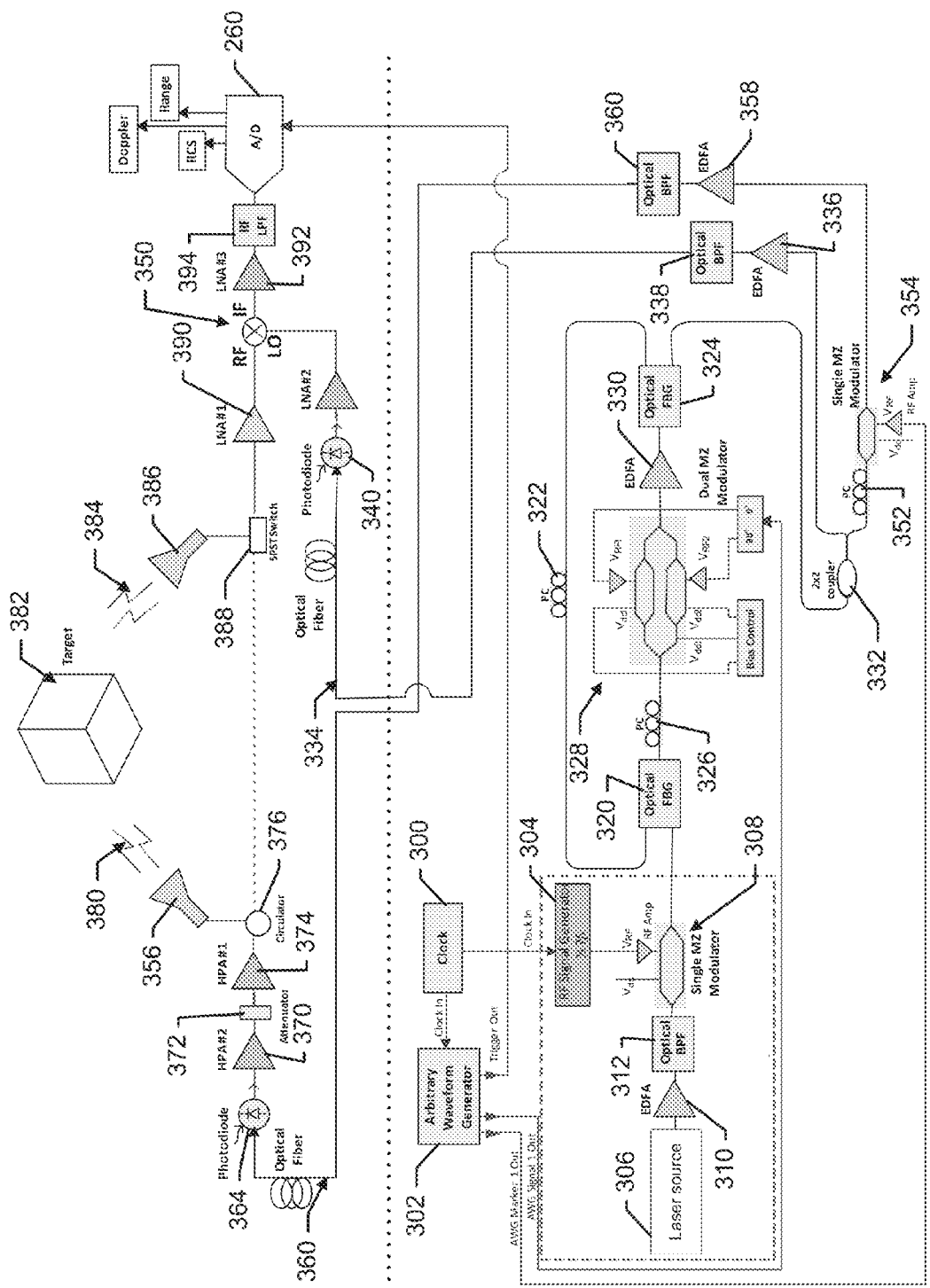
FIG. 3 illustrates a diagram of one hardware implementation of a transmit and/or detection system according to an example embodiment.

FIG. 3 illustrates a more detailed diagram of a subscale radar design of one example embodiment of the system to further illustrate some of the specific components that may be employed to embody the functions described in reference to FIGS. 1 and 2. However, it should be appreciated that the example of FIG. 3 is non-limiting and merely illustrates one possible way to instantiate the functionalities described in reference to FIGS. 1 and 2.

As shown in FIG. 3, a clock 300 may provide input to a waveform generator 302 and an RF signal generator 304. The photonic dual-optical tone generator 200 may be an SBS laser. Otherwise, as shown in the example of FIG. 3, a laser source 306, which may be a low phase-noise tunable laser) may provide an input to a single MZ modulator 308 via an amplifier 310 (e.g., an Erbium doped fiber amplifier (EDFA)) and an optical band pass filter 312. The single MZ modulator 308 may also receive a signal from the RF signal generator 304 to generate an output from the photonic dual-optical tone generator 200, which is then provided to an optical Fiber Bragg Grating (FBG) 320, which may be coupled via a polarization controller 322 to another optical FBG 324, and may also be coupled via a polarization controller 326 to a dual MZ modulator 328. An output of the dual MZ modulator 328 may be provided via another EDFA 330 to the optical FBG 324 for provision to a 2×2 coupler 332. The coupler 332 may provide (via an optical fiber 334) the carrier frequency through an EDFA 336 and an optical band pass filter 338 to a photodiode 340 that is used to convert from the optical to the RF domain. This carrier frequency signal may be provided through a low noise amplifier 342 to a mixer 350 to enable return signals to be processed.

The coupler 332 may also provide an input via a polarization controller 352 to a single MZ modulator 354, which receives the carrier frequency and the output of the waveform generator 302 and provides a modulated signal to a transmitter 356 via an EDFA 358, an optical band pass filter 360, and an optical fiber 362 that feed the optical signal to a photodiode 364 that converts from the optical domain to the RF domain. In some cases, the output of the photodiode 364 may be provided to the transmitter 356 via a first high power amplifier 370, an attenuator 372, a second high power amplifier 374 and a circulator 376. The transmitted RF signal 380 may encounter a target 382 and a return 384 may be received at a receiver 386 and provided to the mixer 350 (in some cases via a single-pulse single-throw switch 388) and a low noise amplifier 390. The mixer 350 may remove the carrier from the received signal and the resulting return signal may be provided to the RF AD converter 260 via a low noise amplifier 392 and an RF low pass filter 394. The digitized received signal generated by the RF AD converter 260 may then be provided to the CDAC 100 to generate the desired output information (e.g., Doppler, radar cross section, range, and/or the like).

As can be appreciated from FIGS. 1-3, the CDAC 100 may employ control, which can be (but is not limited to) software-defined control, over a wide range of carrier frequencies, modulation techniques, and modes of operation via operator selection and interaction with the components of the photonic module 160 and the RF module 170. The CDAC 100 may also control the processing and output of the system. In particular, the CDAC 100 of some example embodiments may be used to select employment of high frequency (HF) linear chirp modulation techniques. In some cases, the CDAC 100 may be used to select employment of stretch processing in connection with the processing of data. Stretch processing enables the processing of very high bandwidth signals that may result at high carrier frequencies. Furthermore, in some examples, the CDAC 100 may be used to select employment of single sideband or dual sideband suppressed carrier (i.e., (SSB-SC) or (DSB-SC)) encoding. The CDAC 100 may therefore provide for a photonics-enabled radar design capable of providing millimeter-wave subscale radar that can be used for testing and simulation with accurate results. A full scale radar is also possible for employment using similar techniques which include the use of photonic modulation for waveform encoding, dual wavelength carrier tone generation and photonic up-conversion modulation onto a carrier.

The carrier frequency ($f_c$) of this example may be 28 GHz for both the RF and the local oscillator, and the frequency may be generated using a DSB-SC technique where an MZ modulator biased at a null and driven by a 14 GHz (½$f_c$) sinusoidal RF signal produces two optical tones spaced $f_c$ apart, centered on the laser wavelength. The two tones may be spectrally separated into two paths via a Fiber Bragg Grating (FBG), with one tone encoded with a train of 40 ns pulses of 4 GHz LFM pulses and the other tone left unmodulated. The LFM is generated by an arbitrary waveform generator (AWG) at a pulse repetition interval of 140 ns, and the encoding is performed using an SSB-SC technique implemented by a dual MZ modulator driven by the AWG signal. Recombining the two tones onto one fiber through another FBG, the optical signal may be amplified, band pass filtered, and transported via optical fiber where a 50:50 splitter may send the optical signal to two photodiodes used to generate a desired RF band signal. Thus, the photodiodes may be selected to provide Ka-band, W band or any other desired RF band signals for RF and local oscillator (LO) signals shown in FIG. 3. The LFMs may be up-converted onto the carrier by heterodyne mixing on the photodiodes (i.e., frequency differencing between the modulated and unmodulated tones). The RF signal may be transmitted directly from the photodiodes to antennas of a transmitter system to be simply transmitted, or, scattered off a target and received by an antenna collocated beside the transmit antenna to maximize received power and minimize cross-talk. The received signal may then be amplified before mixing with the LO, which may also be amplified to drive the LO port of a mixer. The IF signal from the mixer may be sent to an AD converter and digitized signals from the AD converter may be stored (e.g., in the memory 120) and the IF beat note may be frequency-analyzed to calculate range or other useful information via the CDAC 100.

Figure 4A:
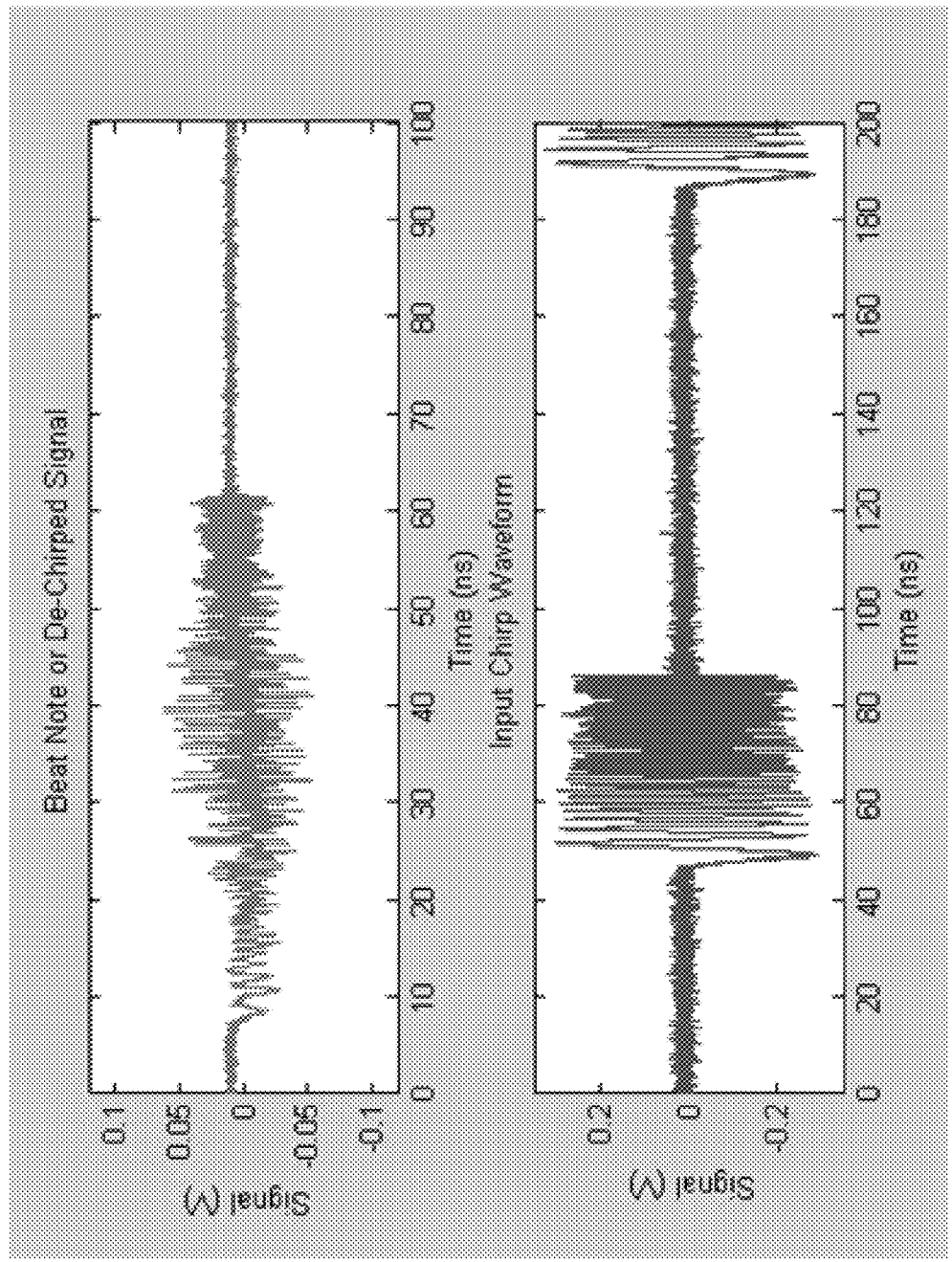
FIGS. 4A and 4B illustrate input linear frequency modulations (LFMs) from an arbitrary waveform generator according to an example embodiment.
Figure 4B:
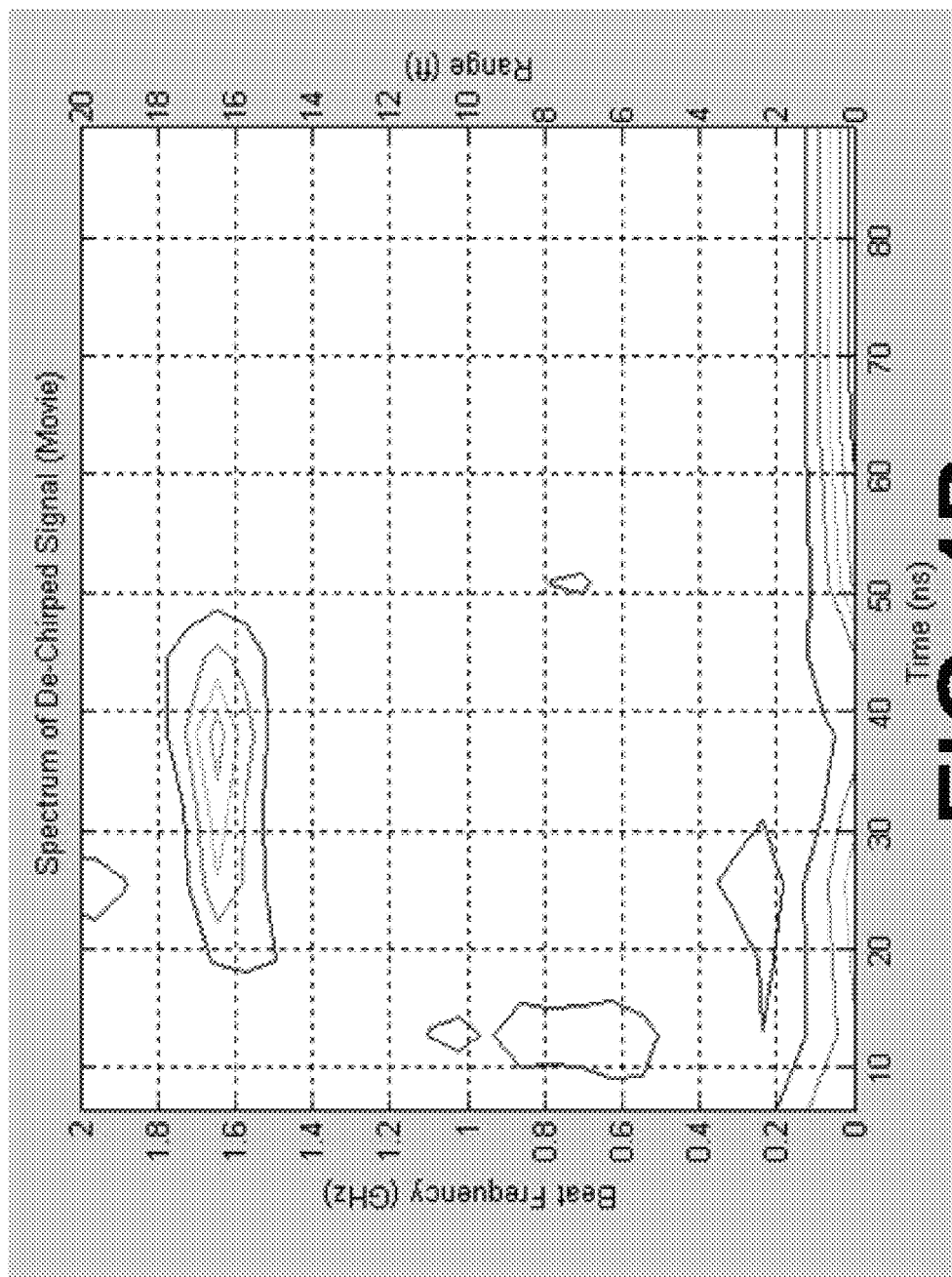
Figure 5:
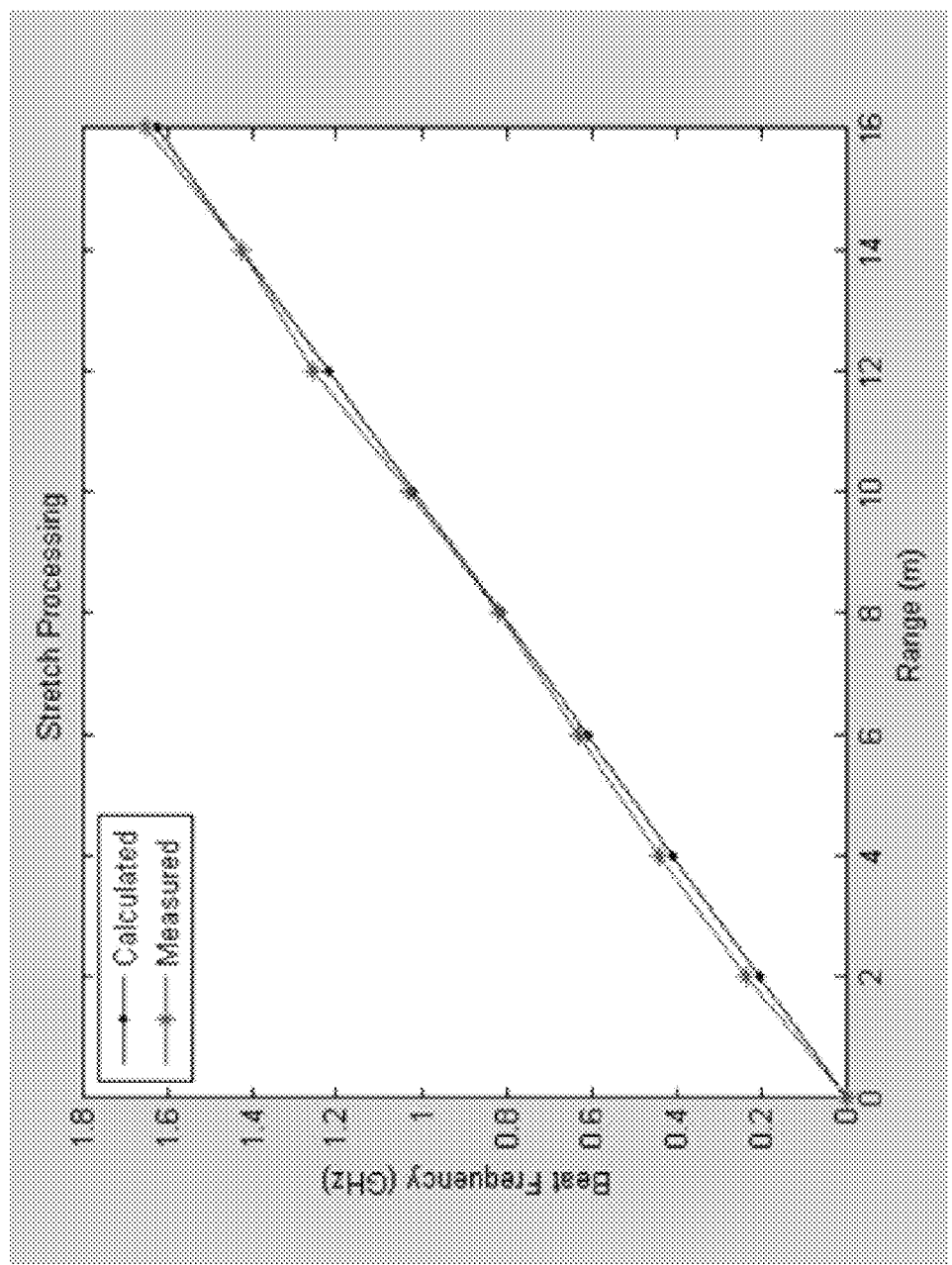
FIG. 5 is a graph showing results for a variety of range measurements as one application of the transmit and/or detection system, in accordance with an example embodiment.

In one example employed in connection with the system of FIG. 3, ranging measurements were performed by moving a 0.23 m corner cube over a range of 0 to 2.44 m (4.88 m round trip) in about 0.3 m increments (0.61 round trip increments) relative to the transmit and receive antennas. FIG. 4, which includes FIGS. 4A and 4B, illustrates input LFMs from the AWG, IF beat notes (see FIG. 4A) and respective IF spectrograms (see FIG. 4B) for round trip ranges of 0.61 m and 3.66 m corresponding to 0.2 GHz and 1.2 GHz IF beat frequencies, respectively. Results from stretch processing, which utilizes the linear relationship between LO-RF LFM offset in range (time) and beat frequency, are shown in FIG. 5 for all range measurements.

Example embodiments therefore represent a design that, when implemented, provides ranging for photonics-enabled subscale radar over any of a number of selected RF bands using stretch processing to achieve excellent ranging results in comparison with calculation. As mentioned above, some other example embodiments may also be employed as a tunable wideband signal generator or frequency source. The SSB-SC waveform encoding, DSB-SC for dual wavelength carrier tone generation, and photodiode up-conversion modulation onto the carrier aspects of the design represent unique improvements. Example embodiments therefore provide improvement relative to photonic-modulation for waveform encoding with high instantaneous bandwidth and dual wavelength carrier tone generation with low phase noise. The ability to perform subscale testing with accurate results enables highly controllable, compact and cost effective testing even for millimeter wave systems that require very low phase noise. Low phase noise signals may provide improved accuracy for any coherent processing application such as, for example, Doppler radar, micro-Doppler, inverse synthetic aperture radar (ISAR), imaging radar and/or the like. High bandwidth-time product signal capabilities, in conjunction with stretch processing, may provide higher ranging resolution and accuracy for radar ranging, range-Doppler radar, 3D imaging radar and/or the like.

Example embodiments may therefore provide extremely high flexibility to change carrier frequency across all RF bands of interest (e.g., from MHz range to 10 s of THz range) with low phase noise and with high bandwidth modulations. Example embodiments may also provide the ability to generate multiple, tunable, simultaneous carrier frequencies with high stability. The use of photodiodes that provide a high power output, enables provision of photonic up-conversion onto the carrier in a robust manner, since high energy and power levels can be tolerated. The high bandwidth of the MZ modulators employed in example embodiments may enable encoding of extremely high and variable bandwidth-time product signals onto the carrier. Furthermore, the support for use of high frequency chirps for the modulation and stretch processing of the output makes processing of the high bandwidth signals tractable, leading to increased ranging resolution. Example embodiments also provide a high degree of versatility by virtue of the ability to specify or change, on the fly, carrier frequency (from MHz range to THz range), modulation (waveform, bandwidth, repetition frequency and pulse length), and mode of operation (transmit-only as a source, receive-only as a receiver, or both transmit and receive as a radar—in monostatic or bistatic configurations). Example embodiments also enable selection of one or more outputs that may be desired (e.g., ranging, Doppler, micro-Doppler, 3D imaging, ISAR, etc.) by software control (via the CDAC 100). Example embodiments may be employed for ship-side radar, for millimeter-wave holographic screening usable in connection with security imaging and clothing retailer imaging, for passive or active millimeter-wave imaging usable in connection with terrestrial surveillance, contraband detection or security imaging, for materials characterization, for HDTV, and for collision avoidance systems usable in connection with millimeter-wave ranging for detection items in proximity to a car and millimeter-wave Doppler for detecting items moving in proximity to a car.

Figure 6:
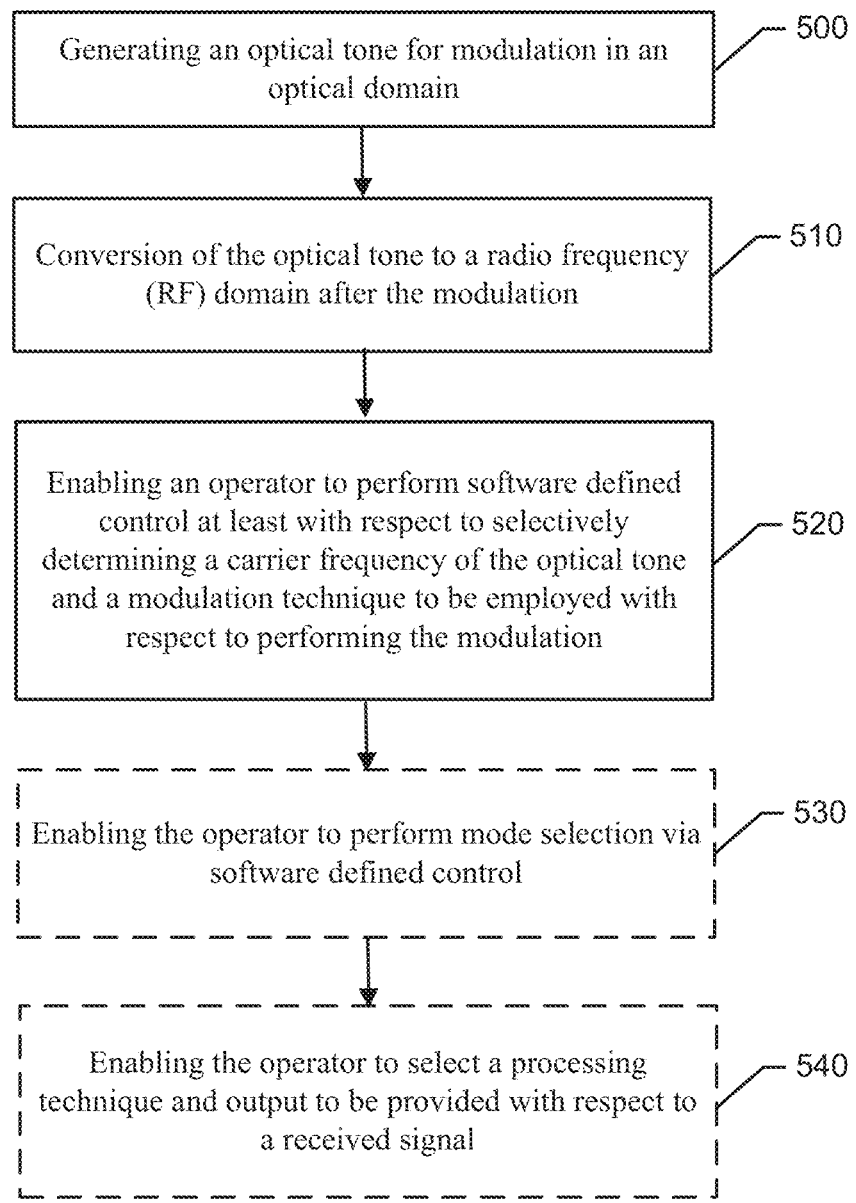
FIG. 6 shows an exemplary block diagram of a method according to an example embodiment.

FIG. 6 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an operator terminal (e.g., a radar suite or test assembly) and executed by a processor in the operator terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method of controlling a detection system according to one embodiment of the invention is shown in FIG. 6. The method may include generating an optical tone for modulation in an optical domain at operation 500, conversion of the optical tone to a radio frequency (RF) domain after the modulation at operation 510, and enabling an operator to control at least with respect to selectively determining a carrier frequency of the optical tone and a modulation technique to be employed with respect to performing the modulation at operation 520.

In some embodiments, additional optional operations may be included or the operations described above may be modified or augmented. Each of the additional operations, modification or augmentations may be practiced in combination with the operations above and/or in combination with each other. Thus, some, all or none of the additional operations, modification or augmentations may be utilized in some embodiments. Some example additional optional operations are shown in dashed lines in FIG. 6. In this regard, in an example embodiment, the method may further include enabling the operator to perform mode selection via operation 530 and/or enabling the operator to select a processing technique and output to be provided with respect to a received signal at operation 540. In some embodiments, selectively determining the carrier frequency may include selecting a carrier frequency in the MHz range to the THz range. Alternatively or additionally, selectively determining the modulation technique may include selecting one or more of a waveform, bandwidth, pulse length and repetition frequency to be employed for the modulation. In an example embodiment, selectively determining the modulation technique and selecting the processing technique may include selecting high frequency linear chirp in combination with stretch processing. Thus, generally speaking, selecting the processing technique may include employing stretch processing.

Some example embodiments may therefore provide for a transmit and/or detection system and a method of operating the same, in which the system is configured to enable the operator to provide robust and dynamic control over the configuration of the system. In this regard, the operator can provide inputs for control over multiple ones of mode of operation of the system, the carrier frequency of the system, the modulation technique to be employed by the system and the processing and/or output that is to be provided by the system to be selected on the fly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A system comprising:
    a photonic module configured to generate an optical tone for modulation in an optical domain prior to conversion to a radio frequency (RF) domain;
    a RF module configured to interface with the photonic module to receive a transmission signal converted from the optical domain; and
    processing circuitry configured to interface with the photonic module and RF module to enable an operator to perform software defined control of the photonic module and the RF module at least with respect to selectively determining a carrier frequency of the optical tone and a modulation technique to be employed with respect to the transmission signal converted from the optical domain.

2. The system of claim 1, wherein the processing circuitry is configured to selectively determine the carrier frequency as a carrier frequency in the MHz range to the THz range.

3. The system of claim 1, wherein the photonic module comprises an optical-to-RF converter configured to employ photonic up-conversion onto a carrier during conversion from the optical domain to the RF domain.

4. The system of claim 1, wherein the photonic module comprises a photonic dual-optical tone generator configured to employ dual wavelength carrier tone generation.

5. The system of claim 4, wherein the photonic dual-optical tone generator is configured to employ dual-sideband suppressed-carrier for dual wavelength carrier tone generation.

6. The system of claim 1, wherein the photonic module comprises a photonic waveform encoder configured to employ photonic-modulation for waveform encoding.

7. The system of claim 6, wherein the photonic waveform encoder is configured to employ single-sideband suppressed-carrier modulation for waveform encoding.

8. The system of claim 1, wherein the processing circuitry is configured to selectively determine the modulation technique by selecting one or more of a waveform, bandwidth, pulse length and repetition frequency to be employed for the modulation.

9. The system of claim 1, wherein the processing circuitry is further configured to enable the operator to perform mode selection via software defined control of the photonic module or the RF module.

10. The system of claim 9, wherein performing mode selection comprises selecting transmit only operation, receiving only operation or transmit and receive operation.

11. The system of claim 10, wherein selecting transmit and receive operation further comprises selecting monostatic transmit and receive mode or bistatic transmit and receive mode.

12. The system of claim 1, wherein the processing circuitry is further configured to enable the operator to select a processing technique and output to be provided with respect to a received signal received by the RF module.

13. The system of claim 12, wherein selecting the processing technique and output comprises selecting one or more outputs providing range, Doppler, micro-Doppler, 3D imaging, and inverse synthetic aperture radar.

14. The system of claim 12, wherein selectively determining the modulation technique and selecting the processing technique comprises selecting high frequency linear chirp in combination with stretch processing.

15. The system of claim 12, wherein selecting the processing technique comprises employing stretch processing.

16. A method comprising:
    generating, by a photonic module, an optical tone for modulation in an optical domain;
    converting the optical tone to a radio frequency (RF) domain after the modulation;
    interfacing, using an RF module, with the photonic module to receive a transmission signal converted from the optical domain; and
    enabling, using processing circuitry, an operator to perform software defined control of the photonic module and the RF module at least with respect to selectively determining a carrier frequency of the optical tone and a modulation technique to be employed with respect to performing the modulation.

17. The method of claim 16, wherein selectively determining the modulation technique comprises selecting one or more of a waveform, bandwidth, pulse length and repetition frequency to be employed for the modulation.

18. The method of claim 16, further comprising enabling the operator to perform mode selection via software defined control.

19. The method of claim 16, further comprising enabling the operator to select a processing technique and output to be provided with respect to a received signal.

20. The method of claim 19, wherein selectively determining the modulation technique and selecting the processing technique comprises selecting high frequency linear chirp in combination with stretch processing.

* * * * *